Figure 1:
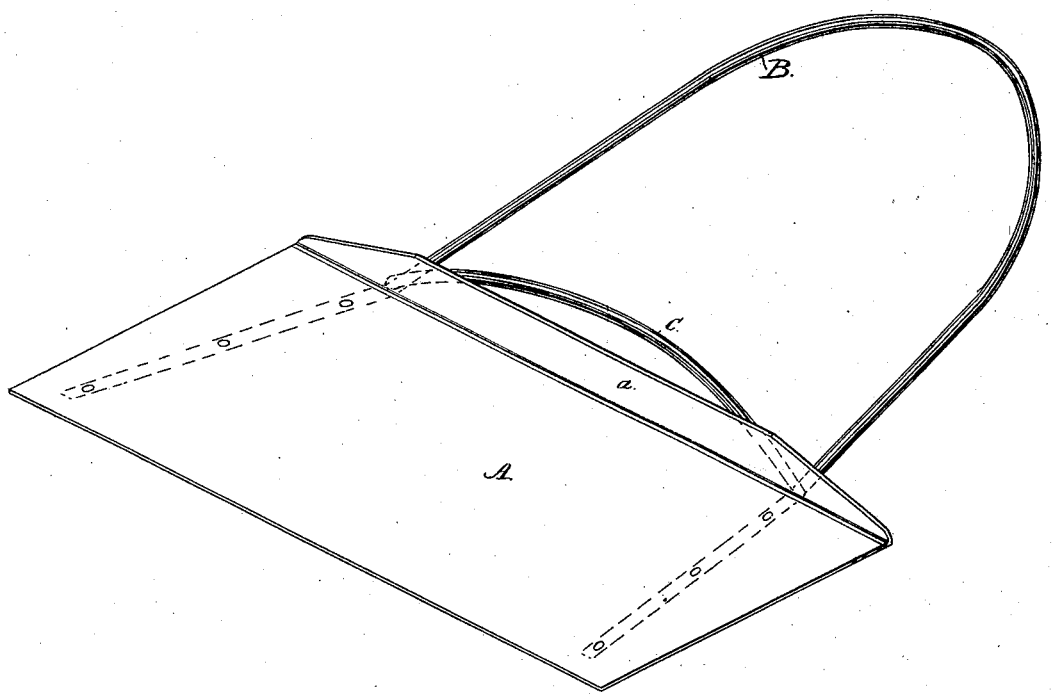

(No Model.)

H. D. WAITE.
SNOW SHOVEL.

No. 321,326. Patented June 30, 1885.

Witnesses.
Philip Kemmer
C. J. Hedrick

Inventor:
Hamilton D. Waite by
A Pollok
his attorney.

N. PETERS, Photo-Lithographer, Washington, D. C.

UNITED STATES PATENT OFFICE.

HAMILTON D. WAITE, OF WATERTOWN, NEW YORK.

SNOW-SHOVEL.

SPECIFICATION forming part of Letters Patent No. 321,326, dated June 30, 1885.

Application filed March 20, 1885. (No model.)

*To all whom it may concern:*

Be it known that I, HAMILTON D. WAITE, a resident of Watertown, in the county of Jefferson and State of New York, have invented a new and useful Snow-Shovel, which improvement is fully set forth in the following specification.

This invention has reference more particularly to shovels for removing snow from sidewalks, but is applicable to shovels used for other purposes.

The device herein described is designed for use as a shovel—that is, for removing the snow by lifting it bodily on the blade of the implement and carrying or throwing it to another spot, and not merely as a scraper, for which purpose only most of the so-called snow-shovels are adapted. It may, however, be also used conveniently as a scraper.

For efficiency and rapid work it is necessary that the implement have a broad and flat blade, as common in snow-scrapers now in use; but to render it possible to employ such an implement as a shovel, special means are herein provided to enable the load to be easily and evenly lifted without liability of tipping to one side or the other of the blade, which, owing to the unequal distribution of the load upon the blade, is difficult to prevent with shovels of ordinary construction. The ordinary snow-scraper, moreover, is wholly unsuited for use as a shovel, owing to its weight, clumsiness, and form of construction.

According to the present invention the blade of the shovel is made wide and flat, and not so thick as to give it undue weight. The handle consists of a bent piece or rod, of wood, (or other material,) approximately U-shaped, the ends of which project under the blade, and are secured to the bottom thereof near its sides. The ends of the handle extend beneath the blade nearly to the lower or front edge thereof, so as to constitute supports, giving it the necessary firmness and strength. As the greater part of the snow upon the blade will lie between the ends of the double handle, liability of tipping will be avoided. The handle may, of course, be formed of two or more pieces. The shovel is further provided with a cross piece or bar, designed both to increase the rigidity of the device and to be grasped in use by one of the hands close to the blade. This bar or piece may extend lengthwise of the handle—that is, from the bend to the middle of the blade—but, preferably, extends across the same from one branch of said handle to the other. One advantage of this construction is that the hand can be shifted along the bar, so as to grasp the shovel in line with the center of gravity of the load, thus greatly facilitating the labor of lifting.

Figure 2:
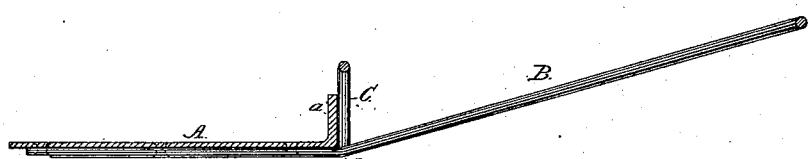

The accompanying drawings show a snow-shovel constructed in accordance with the invention, Figure 1 being a perspective view and Fig. 2 a longitudinal section.

A is the flat oblong blade, which I prefer to make of bass-wood. The dimensions may be three feet in width, one and one-half in depth, and one-half inch in thickness, though these may be varied. The handle B is made preferably of a rod or piece of wood circular in cross-section. It is bent at the middle, so as to bring its two ends a distance apart slightly less than the width of the blade A. As shown, the branches of the handle diverge toward their extremities. They may, however, be practically parallel throughout, and the handle, instead of being continuous, may be formed of two or more pieces. The construction shown is considered the best. In addition to the bend at the top of the handle, it is also bent slightly at the points *b*, where it meets the blade. This bend gives the blade the proper angle with reference to the handle. The ends of the handle extend almost entirely across the blade, whereby they support the latter and take most of the strain of the load. Moreover, a very rigid and firm connection between the two parts is thus effected. It is very evident that with a handle thus constructed and applied the shovel is not apt to tip in lifting an uneven load, as would be the case if a single handle were used with so broad a blade.

C is a curved cross-piece or rod extending from one branch of the handle to the other, and securely attached thereto. It is or may be attached also to the back piece, *a*, of the blade, or it may be made in one piece therewith by cutting an opening of proper shape in the piece *a*. This rod or piece C affords a convenient hold for one of the user's hands, which can be applied at the point at which the steady and even lifting of the load can be best effected.

In using the device as a scraper it would be held at an angle of about forty-five degrees.

While wood is the material preferred for constructing the shovel, it is obvious that metal may be used instead, and also that the form, dimensions, and other details of construction may be varied without departing from the spirit of the invention.

Having thus fully described my said invention, I would observe, in conclusion, that I am aware that heretofore it has been proposed to use as a road-scraper a device having a broad blade provided at the top with a metal bow or loop. Such device, however, differs materially from that herein described and claimed, not being a shovel or a hand implement of any kind, and not being designed or adapted to the lifting of unequally-distributed loads. I am also aware that it is not new, broadly, to provide a scoop or a shovel with an auxiliary handle, and I do not therefore claim a second or auxiliary handle, broadly, as my invention; but

What I do claim, and desire to secure by Letters Patent, is—

1. A snow-shovel comprising a broad flat blade, and a double curved handle having its ends extending under and across the blade and fastened thereto close to its sides, whereby an unequally-distributed load may be readily lifted, substantially as shown and described.

2. A snow-shovel comprising a flat blade, a bent handle having divergent ends which extend under and across the blade, so as to support the same, and a cross-bar or rod close to the blade and extending from one branch to the other of the bent handle, substantially as described.

In testimony whereof I have signed this specification in the presence of two subscribing witnesses.

HAMILTON D. WAITE.

Witnesses:
 ROBERT HITCHCOCK,
 J. W. MOAK.